May 23, 1939. J. E. BRANTLY 2,159,250

OIL WELL HOIST

Filed Nov. 10, 1937 4 Sheets-Sheet 3

Inventor:
John E. Brantly.

Attorney.

Patented May 23, 1939

2,159,250

UNITED STATES PATENT OFFICE 2,159,250

OIL WELL HOIST

John E. Brantly, Pasadena, Calif.

Application November 10, 1937, Serial No. 173,860

17 Claims. (Cl. 254—187)

This invention has to do generally with oil well hoists and has for its major object to improve such hoists in a number of respects that will render them better adaptable to working conditions in oil well operations and to certain types of prime movers whose use in the ordinary draw-works has always involved serious difficulties.

The common hoist or draw-works comprises the usual cable winding drum keyed or otherwise positively fixed to its shaft, which in turn has positive clutch connections with a free running sprocket that normally is driven by a prime mover through a speed transmission including two or three shafts (for example a jack shaft and a line shaft), and sprockets and chains in numbers and combinations that give from two to four different speed changes. The free running sprocket on the drum shaft is provided in order that only the drum and its shaft need be driven by the blocks and hook when the latter are descending in the derrick without load. However, even with this minimum mass to be rotated, the blocks frequently are very sluggish and move more slowly than is desirable. The jack shaft is directly driven by the prime mover through selectable positive or square faced clutches. As a result, assuming the drum shaft clutch to be engaged so that the line shaft then drives the drum shaft, when the selected jack shaft clutch is engaged, the entire load on the cable is suddenly transmitted to the prime mover.

In ordinary operations, the driller starts the prime mover and engages a selected clutch to suddenly and positively clutch a prime mover driven sprocket with the jack shaft. As a result, a sudden shock is applied to all parts of the equipment, including the prime mover. The drill pipe is strained, the cable receives a severe shock which is very harmful, sudden and excessive hammering loads are thrown on the chains causing fatigue, and the moving parts of the prime mover are severely taxed. It is well known that prime movers, chains and wire lines in rotary drilling service have much shorter useful life and perform less service during their life, than do similar pieces of equipment operating under conditions where shocks are not prevalent. Where a reciprocating steam engine or a direct current electric motor is used as the prime mover, the shocks need not be severe, because of the very low speeds at which these types of prime movers may be started under load. However, where alternating current electric motors or internal combustion engines are used, the shocks necessarily are very severe, due to the fact that initially these prime movers must be operated at comparatively high speed in order to move the heavy loads imposed upon them.

Because of the high pull out torque required in a prime mover to enable it to lift the drill string load off bottom, and the sudden start imparted by the usual positive or square jaw clutches, excessive capacity engines or motors must be used. If run sufficiently slowly to diminish the shock within inconsequential limits, the engine or motor would ordinarily stall because of the heavy load imposed. Therefore, the practice has been to operate the prime mover at the necessary initial speed and to allow all the working parts to assume the shock. It would seem that these difficulties might be avoided by installing a friction clutch between the prime mover and the speed transmission, or between the drum proper and the speed transmission. The objection, however, to such an expedient is that the blocks in descending from the top of the derrick to the floor, must rotate the drum shaft and all sprockets and chains back to the friction clutch. Since there is not sufficient weight in any traveling block or hook presently built to do this, power would have to be applied in reverse movement to back the blocks down the derrick. This is objectionable in that it slows up the operation, and frequently results in kinks being thrown in the line as it passes over the fast moving sheaves, spoiling costly drilling line and necessitating shut-downs.

These shortcomings of the usual draw-works are obviated in accordance with the invention by applying friction clutches directly to the drum itself, and providing means for actuating the clutches in a manner or sequence that will most effectively conform with the power characteristics of a given prime mover. For example, the torque and horse power curves of the internal combustion engine are exactly the reverse of those best suited to oil well hoisting. The invention provides a means whereby the torque curve of the drum spool can be made to approach the torque curve of a steam engine or a direct current motor, both of which are ideal. In addition, the invention in effect lowers the pull out requirements of the prime mover, thus permitting the use of engines having substantially lower horse power capacity.

In the present hoist, the assumption of load by the prime mover is controlled by friction clutches, preferably of a cone-shaped type, applied directly to a drum that is rotatable on its shaft. The clutches, in turn, are operated by control mechanism that will permit transmission of full load from the drum to the prime mover at a rate that will permit maintenance of the most efficient prime mover operating speed and torque at any one time and for any load increment. On the other hand, provision is made for rendering the drum as free running as possible while the blocks and hook are falling under their own weight, by mounting the drum for rotation in its shaft. In addition to the above mentioned aspects, the invention has a further important feature in the provision, together with the drum friction clutches, of an arrangement of positive clutches that afford secure connection between the drum and its shaft when the friction clutches are engaged. Additional features of the invention have to do with such improvements as details of the friction clutches and their operating mechanism, and a water cooling system associated with both the friction brakes and clutches.

All the above mentioned objects and features of the invention, as well as numerous additional objects and details thereof will be explained to best advantage in the following description of the invention in certain typical and illustrative forms. Throughout the description reference is had to the accompanying drawings, in which.

Figure 1:
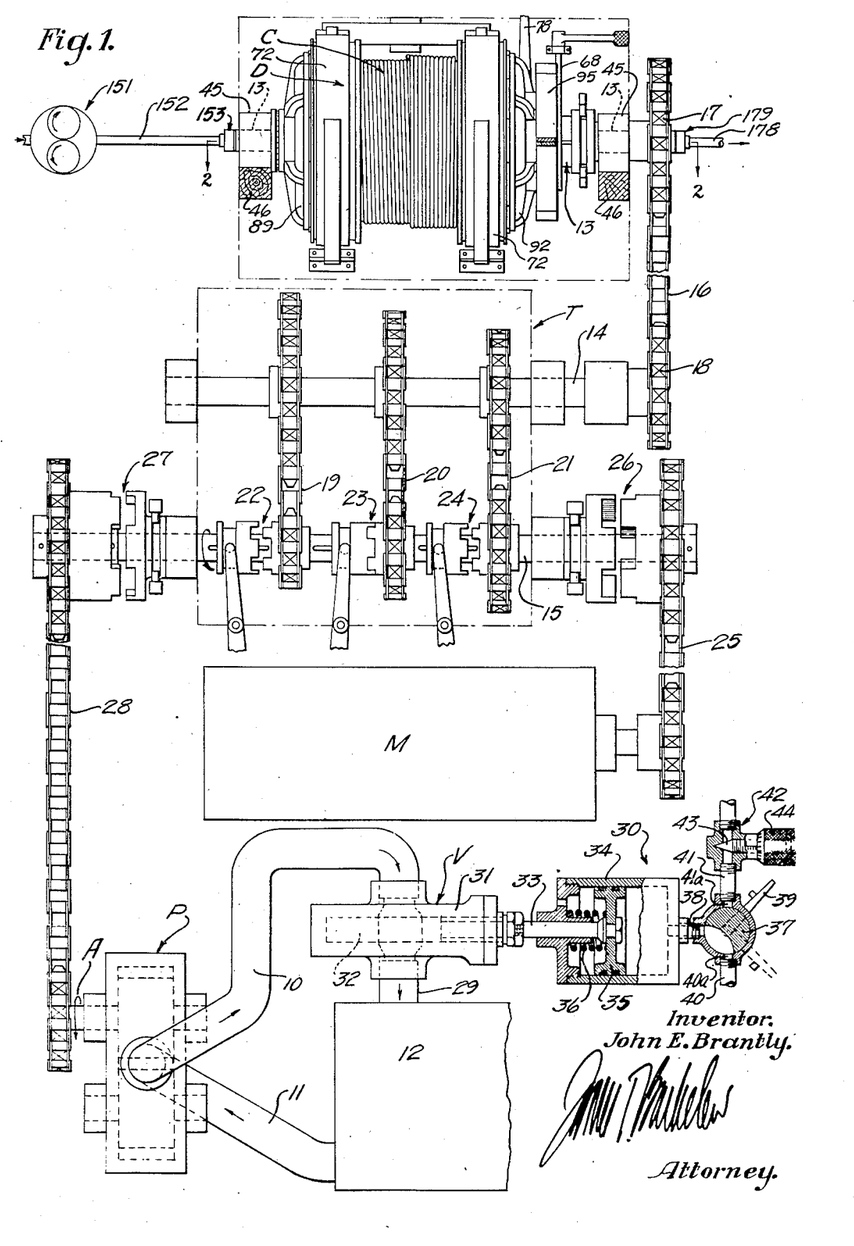
Fig. 1 is a general view, diagrammatic in parts, illustrating a typical draw-works embodying the invention.

In Fig. 1 of the drawings, the draw-works is shown to comprise the winding drum assembly D, the speed transmission generally indicated at T, and a suitable type of prime mover M which drives the winding drum through the transmission T. Lowering of the pipe string supported by the cable C spooled about the winding drum D, is controllable by a hydraulic brake system that includes a positive displacement pump P driven by suitable connection with the speed transmission T, and a fluid circulating system including pipes 10, 11 and tank 12, the fluid flow through which is controlled by a suitable valve V.

I here show illustratively a three-shaft draw-works, including the drum shaft 13, line shaft 14 and jack shaft 15. Shafts 13 and 14 are connected by chain 16 trained about sprockets 17 and 18 that are usually of such ratio that the line shaft 14 runs substantially faster than the drum shaft. Between the line shaft and jack shaft 15, it is common to have several drives of different speed ratios, and as illustrative, I show three such chain drives 19, 20 and 21 each having its individual clutch 22, 23 and 24, whereby the jack shaft may be connected to the line shaft at varying ratios. The prime mover M is connected to the jack shaft by chain drive 25 and a suitable clutch generally indicated at 26. The prime mover, as stated, supplies the power for hoisting operations, and the clutch 26 provides means for disconnecting the prime mover from the transmission T whenever such disconnection is desired to be made.

Broadly speaking, the hydraulic braking mechanism may have any suitable connection with the draw-works that will operate the pump P at a rate sufficient to give a rate of fluid displacement by the pump sufficient for proper braking control. The pump conveniently may be driven by a connection with either one of the speed transmission shafts, though preferably with the jack shaft 15 because of its higher rotative speed, by a suitable type of clutch, conventionally illustrated at 27, of a known automatic type that will always insure a positive driving connection between the jack shaft and the pump when the shaft is rotated in the direction of the arrow A and while the pipe string is being lowered, i. e. as the cable C is being spooled off the drum.

In the hydraulic braking mechanism, the pump P, here illustrated as a positive displacement pump of the gear type, has a chain drive connection 28 with the clutch 27. As stated, the liquid circulatory system for the pump P includes the outlet pipe 10 which leads from the discharge side of the pump to the control valve V. From the control valve a pipe 29 leads to the fluid reservoir or tank 12, from which the return pipe 11 leads back to the pump intake. The control valve V need not be shown or described in detail, since it will suffice to state that the valve may be of any suitable type or form capable of proper regulation and restriction of the rate of fluid discharge from the pump to the tank, under control of the mechanism generally indicated at 30. The valve is conventionally illustrated as having a suitable casing 31 containing a slide valve block 32 provided with an opening (not shown) registerable with fluid inlet and outlet ports in the casing. Valve block 32 is connected with the valve rod 33 which extends into a cylinder 34 and there connects with the operating piston 35. Compression spring 36 acts to move the piston and valve block 32 toward the right—toward the closed position of the valve. The valve therefore normally is closed by the action of spring 36.

Piston 35 is operated by fluid pressure derived from any suitable source. A three-way valve 37 controls the admission and exhaust of operating fluid to and from the cylinder, through the passage 38. Valve 37 is adjustable by handle 39 to connect the cylinder passage 38 with the pressure supply line 40 or with the exhaust pipe 41 and to close the inlet port 40a without opening the exhaust port 41a. The exhaust line connects with a regulation valve 42 having a needle 43 and a micrometer adjustment head 44 by means of which the valve may be finely adjusted. The control valve 32 may be opened to any desired extent by operating valve 37 to admit pressure fluid to cylinder 34. When valve 32 has been opened to the desired point, valve 37 may be thrown to closed position, and valve 32 will then be held in the selected and set position. To close the control valve 32, valve 37 is thrown to exhaust fluid pressure from cylinder 34 through valve 42, this valve being set to restrict the escape of fluid so that closing of the control valve is retarded to the extent that it can close only at a rate that will not place any dangerous shock on the pipe string, hoisting cable or any of the draw-work parts, by reason of the mechanism being stopped too quickly.

At this point it may be observed that in the absence of the later described friction clutches associated with the winding drum, as in the usual draw-works, only positive clutch connections would be provided between the prime mover M and the drum spool. Such positive clutch connections include the usual clutch between the drum shaft and the drum proper or spool, the speed change clutches 22, 23 and 24, and the main jack shaft clutch 26. Consequently, assuming the prime mover M to be of a common constant speed type, when any of the clutches is thrown in to complete the driving connection between the prime mover and the drum spool, a heavy shock is imposed upon all parts of the draw-works and is transmitted to the hoisting cable C and the pipe string. As stated hereinabove, one of my major objects is to avoid this common and serious defect in the usual draw-works by providing friction clutches between the winding drum proper and its shaft, so that at the start of the hoisting operation, the load may be assumed gradually and uniformly by the draw-works, and at a rate consistent with the power characteristics of the prime mover.

Figure 2:
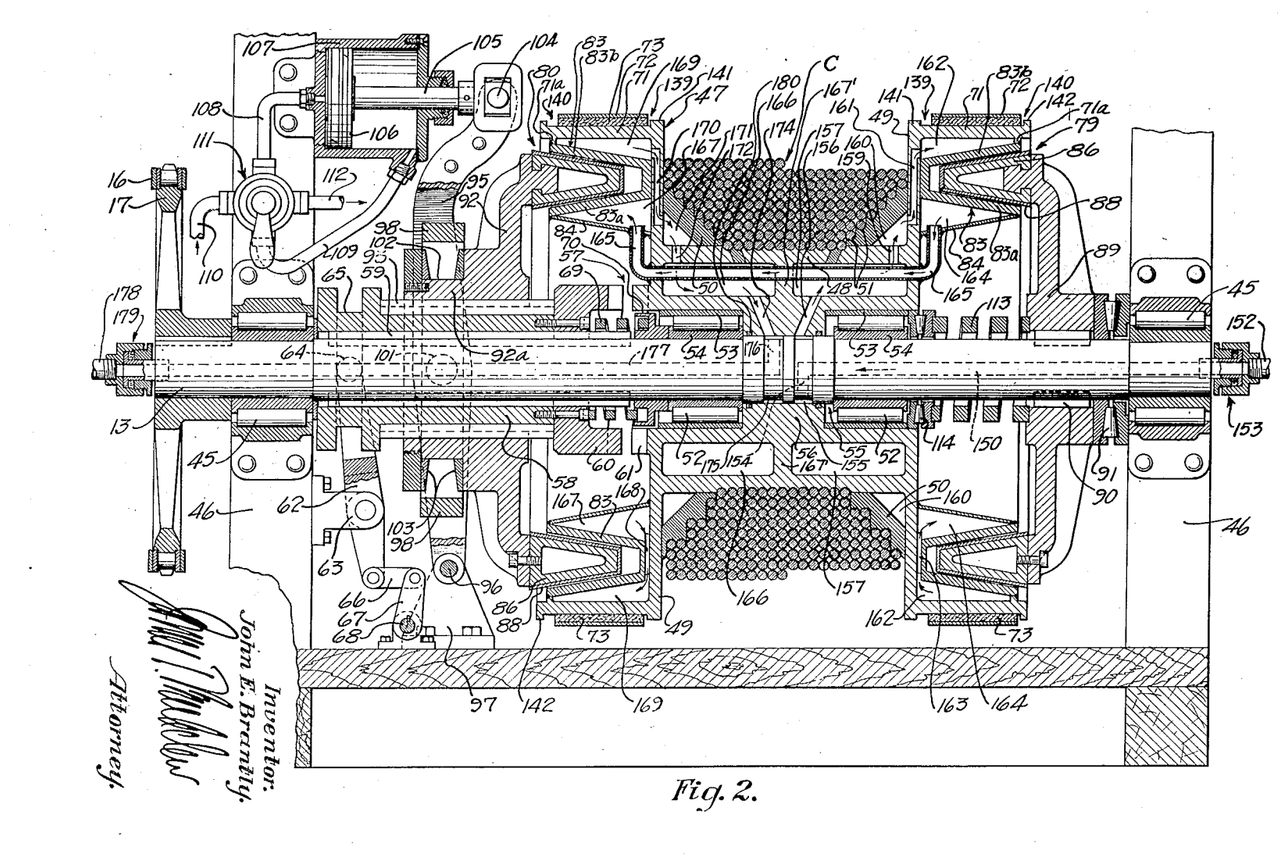
Fig. 2 is a section taken longitudinally through the winding drum, as on line 2—2 of Fig. 1, illustrating a preferred form of clutch mechanism.

Referring to Fig. 2 wherein the winding drum assembly is shown in detail, the drum shaft 13 is shown to be journaled in bearings 45 mounted on suitable upright supports 46. The drum proper, generally indicated at 47, comprises the cable winding spool having a cylindric base 48, and axially spaced end walls 49. If desired, the spool may be provided with inclined annular fillets 50 formed of soft metal, for example lead, or other material such as rubber, that is sufficiently soft that the cable C, when repeatedly wound about the drum under load, will impress within the surfaces of the fillets 50, spirally annular grooves 51 in such positions as to maintain the horizontal courses of the cable in proper overlapping relationship. Also if desired, the grooves 51 may be preformed in the faces of the soft metal fillets, in order to predetermine the overlapping relationship of the cable courses.

Figure 3:
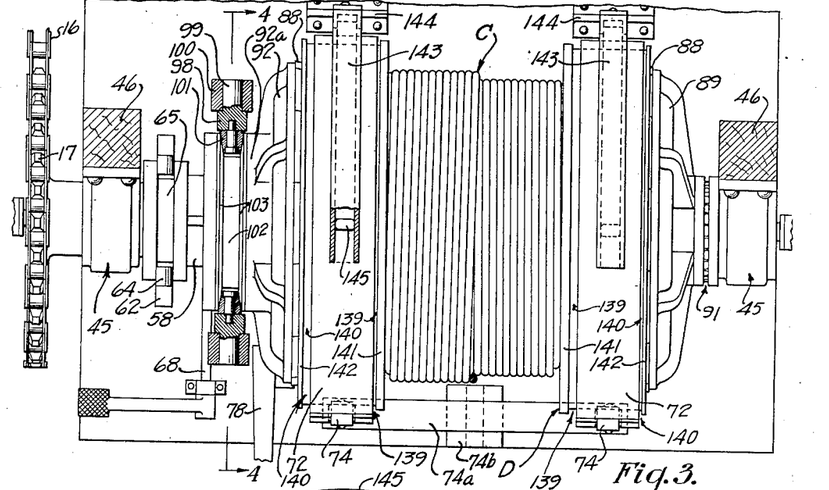
Fig. 3 is a plan view, on reduced scale, of the winding drum assembly shown in Fig. 2.

The drum is mounted for both rotational and longitudinal movement on its shaft 13, the drum rotating on roller bearings 52 between race sleeves 53 and 54, and the drum being shiftable longitudinally on the shaft as permitted by the clearance at 55 between the hub portion 56 and the ends of race sleeves 54. A positive clutch, generally indicated at 57 provides a releasable driving connection between the shaft 13 of the drum 47. Clutch 57 may be regarded as including a somewhat elongated sleeve 58 splined to the shaft as indicated at 59, and movable longitudinally thereof to bring the tooth clutch member 60 into engagement with the toothed end 61 of the drum. The clutch operating mechanism is shown typically to comprise a lever 62 pivotally mounted on bearing 63 attached to the support 46, the upper bifurcated end of lever 62 carrying rollers 64, see Fig. 3, received within an annular groove 65 in the outer end of the clutch sleeve 58. The lower end of lever 62 is connected by link 66 and arm 67 with shaft 68 that may be manually operated to thrust sleeve 58 longitudinally of the shaft to bring the clutch elements into engagement. A coil spring 69 confined between ring 70 and the clutch member 60 acts to disengage the clutch when the clutch engaging mechanism is released.

Figure 4:
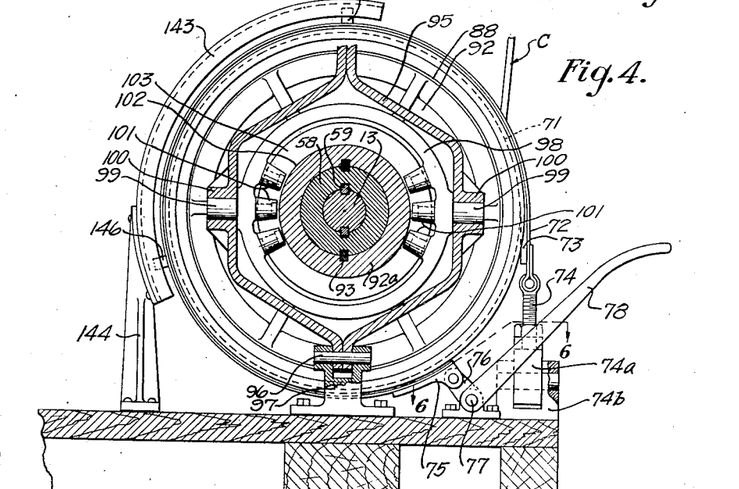
Fig. 4 is a section taken on line 4—4 of Fig. 3.

The drum 47 carries the usual brake flanges 71 to which are applied companion brake mechanisms comprising bands 72 carrying the friction linings 73 and anchored to the usual adjustable bolts 74, see Fig. 4, carried by an equalizer bar 74a pivotally and centrally mounted on a base 74b. The opposite end of the band carrying shoe 75 is pivotally connected to arm 76 carried on shaft 77 which is operated by hand lever 78. As in the usual form of winding drum dual brakes, both arms 76 are carried on the same shaft 77 so that both brakes may be controlled from the single lever 78.

A pair of friction clutches, generally indicated at 79 and 80, are provided at the opposite flanged ends of the drum. As herein used, the term "friction clutch" is to be distinguished from a grab-type clutch, herein termed "positive clutch". By a positive clutch I mean a type of clutch, such as a toothed form shown at 57, that operates to clutch together the relatively rotating parts without permitting their continued relative rotation as the clutch is thrown in. By friction clutch, I mean a form of clutch which when applied, permits continued relative rotation between the parts, but at the same time transmits rotative force from one companion clutch part to the other, until the clutch applying force reaches a magnitude such that, under the existent coefficient of friction between the clutch faces, the companion clutch parts will rotate together. I prefer to use cone friction clutches at 79 and 80, which may be of any suitable form and design including an annular female part comprising convergent friction surfaces, and a male clutch member of wedge shape cross sectional form.

Each of the specifically illustrated friction clutches comprises an annular substantially V-shaped seating member 83 contained within the flanged end of the drum, and having inwardly convergent sides 83a and 83b, the outer ends of which may be welded to plate 84 and to the brake flange 71a, as illustrated. The base of member 83 may be secured to wall 49 by welding or other suitable means. The annular male clutch member 86 which may carry a friction lining 88, is wedge shaped in cross section in conformity with the taper of sides 83a, 83b of the female member.

The male clutch member 86 of clutch 79 is mounted on a carrier 89 splined to the shaft 13 at 90 and engaging a roller thrust bearing 91. Member 86 of clutch 80 is supported on a similar carrier 92 which in turn is mounted on the positive clutch sleeve 58 and is connected thereto by splines 93 causing the sleeve and carrier to rotate together but permitting the carrier to move longitudinally on the sleeve. The clutches 79 and 80 are brought into sequential operation in the manner hereinafter explained, by means of a fluid pressure operated yoke 95 extending about portion 92a of carrier 92 and pivotally connected at its lower end by pin 96 to a suitable base or anchor 97. Yoke 95 carries a ring 98 supported within the yoke or trunnions 99 journaled in the yoke carried bearings 100. Ring 98 in turn carries a plurality of tapered rollers 101 projecting into an annular groove 102 in the carrier 92, the sides of the groove being lined with bearing rings 103.

The upper end of yoke 95 is pivotally connected at 104 with the rod 105 of a fluid pressure actuated piston 106 contained within cylinder 107. Any suitable piston operating fluid may be employed, although compressed air may be specified as typical and preferred. Opposite ends of the cylinders 107 are connected with fluid supply lines 108 and 109 to which operating fluid is selectively delivered from line 110 under control of a four-way valve 111. When operating fluid is delivered to the cylinder at one side of the piston, the cylinder at the opposite side thereof is vented through the valve 111 to the exhaust line 112. As will be apparent from the foregoing, by operation of valve 111, yoke 95 may be swung about its pivot 96 to throw clutch 80 into and out of engagement.

Clutch 79 is engaged by longitudinally shifting movement of the drum 47 on the shaft 13 toward the male clutch member 86. Such movement of the drum is yieldably resisted by a coil spring 113 placed about the shaft and confined between carrier 89 and the roller bearing 114. Thus the two clutches 80 and 79 are sequentially engageable in the order named, and disengageable in the reverse order. By admitting operating fluid to cylinder 107 through line 108, piston 106 and yoke 95 are displaced to the right, throwing clutch member 86 of clutch 80 into engagement with its seat 83 with a variably controllable amount of pressure regulated by the operation of valve 111. Accordingly, the load initially is transmitted from the drum to the shaft 13 by way of clutch 80, the positive clutch 57 and clutch 79 at the time being disengaged. By continued movement of yoke 95 toward the right, clutch 80 becomes fully engaged and the drum is shifted longitudinally of the shaft to bring the seat 83 of clutch 79 into engagement with its male clutch member 86, whereupon the drum becomes clutched to the shaft by both friction clutches. Then, if desired, the clutch 57 may be engaged to positively lock the drum to its shaft, though this will not be done in ordinary operation.

Provision is made whereby longitudinal shifting movement of the drum, as the clutches 79 and 80 are thrown into engagement, will not interfere with the manually operated brakes applied to the drum flanges. As shown in the drawings, clearances are provided at 139 and 140 between the edges of the brake bands 72 and friction lining 73, and the drum flanges 141 and 142 at the ends of the friction surfaces of the drum. These clearances are made ample to permit longitudinal shifting of the drum within its full range of movement without interfering with the brake bands, leaving the latter in proper relation to the friction surfaces of the drum for application thereto in any position of the drum. As shown in Fig. 4, suitable means may be provided for supporting the brake bands in substantially fixed position longitudinally of the drum shaft, to prevent the drum, as it shifts, from dragging the bands out of proper position. The band support may consist of any suitable means, for example arcuate supporting members 143, one for each band, mounted on bracket 144 and connected to the band at 145 and 146.

Figure 6:
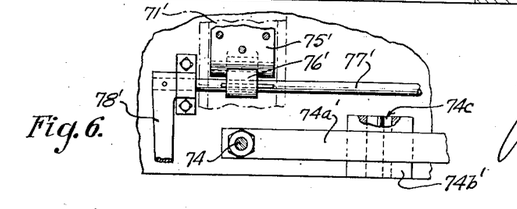
Fig. 6 is a fragmentary plan taken as indicated by line 6—6 of Fig. 4.

Instead of remaining stationary while the drum shifts longitudinally, the bands may be mounted to shift with the drum. For example, in Fig. 6 I show the bands to be actuated by rock shaft 77' carrying the lever 78' and having a spline connection with arm 76' so that the latter is shiftable longitudinally on the shaft. Each band anchor bolt 74 may be caused to shift with the band by any suitable means, as by threading the bolts into a bar 74a' that has a pin and slot connection at 74c with a bifurcated base block 74b'. As the drum, indicated by the dot-dash lines 71, shifts upon operation of the clutch as previously explained, the drum flanges engage each of the then untensioned brake bands and cause them to shift bodily with the drum, as permitted by the spline connection of arms 76' with the rock shaft, and the pin and slot connection between anchor bolts 74 and their support 74b. As will be understood, when the brake bands are mounted for shifting movement with the drum, the band support 143, 144, etc. need not be used.

Figure 5:
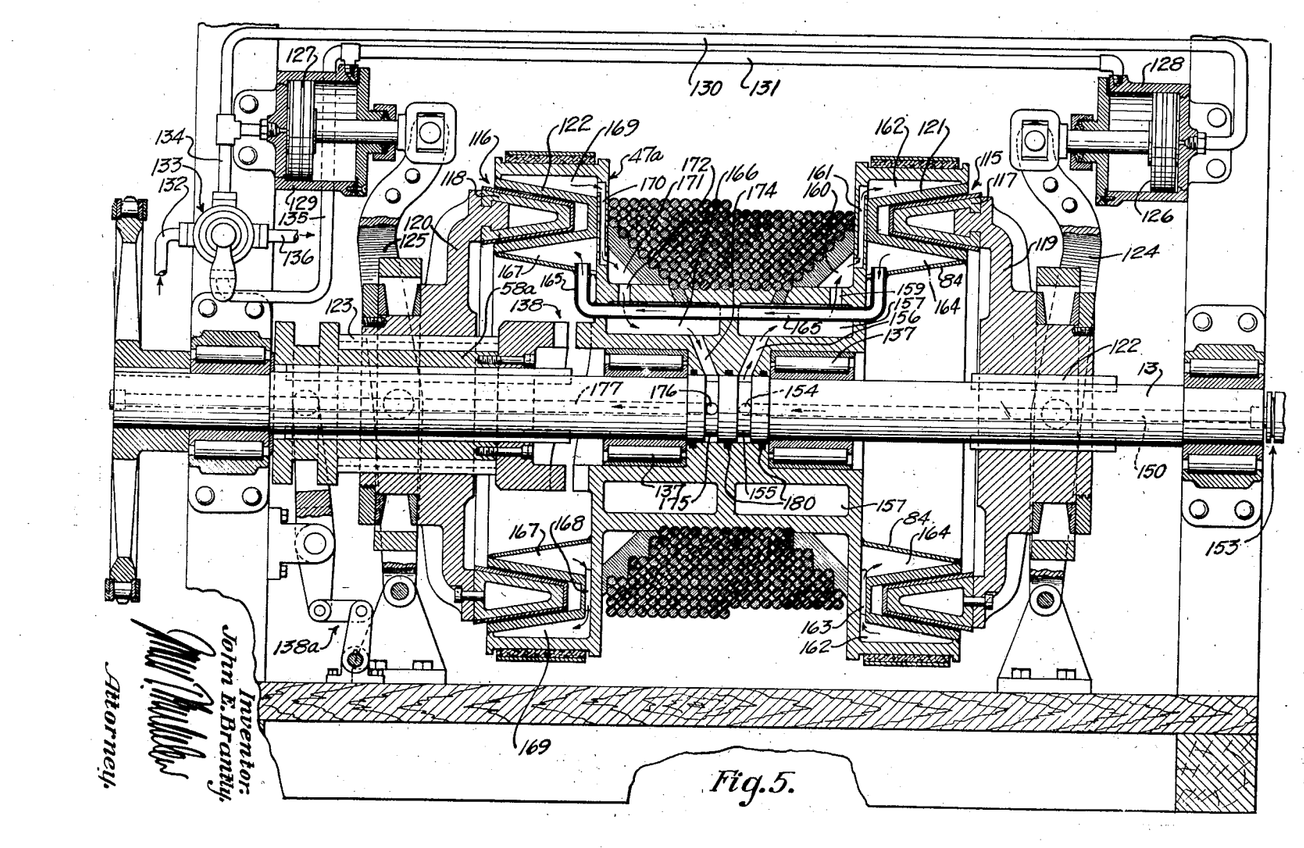
Fig. 5 is a sectional view similar to Fig. 2, illustrating a variant form of the invention.

In Fig. 5 I show a variational form of drum and clutch assembly generally similar to that described with reference to Fig. 2, but differing primarily in that the friction clutches, instead of being related for compound or sequential operation, are simultaneously thrown into and out of engagement. Here the friction clutches 115 and 116 include, as in the previously described form, the male clutch members 117 and 118 mounted on the carriers 119 and 120 movable longitudinally of the shaft into and out of engagement with the seats 121 and 122. Carriers 119 and 120 have spline connections 122 and 123 with the shaft 13 and the positive clutch sleeve 58a, respectively, and are actuated in engaging and disengaging the clutches by yoke assemblies 124 and 125 similar to the yoke 95 and associated parts shown in Figs. 2 and 4. The yoke assemblies are operated by pistons 126 and 127 in cylinders 128 and 129, opposite ends of which are interconnected by lines 130 and 131. Operating fluid is selectively delivered to lines 130 and 131 from supply line 132 under control of four-way valve 133 by way of pipes 134 and 135. The exhaust line leading from the valve is indicated at 136.

The drum 47a is mounted on roller bearings 137 which, preferably, will permit some longitudinal shifting movement of the drum; just enough to equalize the action of the two friction clutches 115 and 116. By turning valve 133 to admit pressure fluid to lines 134 and 130, pistons 127 and 128 actuate the yokes 124 and 125 to throw the male clutch members 117 and 118 into engagement with their drum seats. The control valve permits closer regulator delivery of operating fluid to the cylinders so that the clutches may be gradually engaged in order that the transmission of load to the prime mover will be correspondingly gradual. To disengage the clutches, valve 133 is thrown to place lines 135 and 131 in communication with the supply line 132, and lines 134 and 130 in communication with the exhaust 136. As in the previously described form, I preferably provide, in addition to the friction clutches 115 and 116, the positive clutch 138 which may be thrown into engagement by its operating mechanism generally indicated at 138a, to positively lock the drum to its shaft.

I may incorporate in either or both the described drum and clutch assemblies, a system for circulating cooling fluid in heat transferring relation with the brake and clutch parts, the relative arrangement of the brake flanges and clutch parts being such that the same stream of cooling fluid may conveniently be used to cool both the brakes and clutches. The same type of cooling system is shown in both assemblies illustrated in Figs. 2 and 5, and in the description to follow, the same reference characters are applied to corresponding parts of the cooling system in the two views. A cooling fluid, such as water or oil, may be introduced under pressure to the shaft bore 150 by suitable means such as a pump 151, see Fig. 1, discharging through a line 152 that has a swivel connection at 153 with the drum shaft. The fluid is discharged from bore 150 through a lateral passage 154 into the annular shaft groove 155, and thence through passage 156 leading from groove 155 into the annular chamber 157 within the drum. The fluid fills chamber 157 and is forced outwardly through passage 159 into annular space 160 between the soft fillet 50 and the corner wall of the drum, and thence through passage 161 in the drum wall into the annular space 162 between the outer clutch wall and the drum brake flange. It will be understood of course that all the various fluid passages may be made of sufficient size to accommodate the required rate of fluid circulation. After being discharged into space 162 from passage 161, the fluid circulates in opposite directions in heat transferring relation with the brake flange and outer clutch seat wall to a diametrically opposite point in the drum at which the fluid then flows through passage 163 into annular chamber 164 between wall 84 and the inner wall of the clutch seat. Again the fluid circulates in opposite directions within chamber 164 to a diametrically opposite point at which the fluid is discharged from the right-hand end of the drum by way of pipe 165.

Pipe 165 extends longitudinally through the annular hollow drum chambers 157 and 166 and through the partition wall 167' separating them. Flowing in the course indicated by the arrows, the fluid is discharged from the opposite end of pipe 165 into annular chamber 167 within which the fluid flows in opposite directions to a diametrically opposite point of discharge through passage 168 into the annular space 169 between the outer clutch wall and brake flange. Then the fluid circulates in opposite directions within chamber 169 and is discharged through passage 170 into the annular space 171, and then through a passage 172 into chamber 166. The fluid thence is forced through passage 174 into the annular shaft groove 175 and the lateral shaft passage 176, to be finally discharged through the shaft bore 177 to a cooler, or other disposition, by way of pipe 178 having a swivel connection 179 with the shaft. Suitable packing rings 180 may be provided for the purpose of preventing fluid leakage from the shaft grooves 155 and 175 beyond the central shaft engaging hub 56 of the drum.

In considering the operation of the hoist, the prime mover M may be assumed to be an internal combustion engine operating under governor controlled constant normal speed when picking up or hoisting a load, and at a slower but constant idling speed when not working under load. Also assume that it is desired to withdraw the drill pipe from the well and that at the start of operations, the prime mover is running under governor control at normal speed. After the elevator is attached to the drill pipe in accordance with the usual procedure, and with clutch 26 and one of clutches 22, 23 or 24 engaged, operating fluid is admitted to the cylinder, 107 or 128, 129, to bring the friction clutches 79, 80 or 115, 116 into initial engagement. The rate of the clutch engagement, or the rate at which fluid pressure is applied in bringing the friction surfaces of the clutch into engagement, will be so regulated by the operator that the load will begin moving at a rate permitting the engine to continue operating at substantially its constant normal speed. Then as the load gains momentum the clutches will be fully and positively engaged and the motor will begin operating at its full horse power output, or the horse power output necessary to hoist the load. In the operation of the friction clutches shown in Fig. 2, clutch 80 will first be engaged, and pressure applied to member 92 will gradually shift the drum toward the right to engage clutch 79 by bringing its seat member 83 into engagement with the male member 86. As previously pointed out, coil spring 113 resists shifting movement of the drum in a clutch engaging direction, and the resistance offered by the spring will be made sufficient to insure properly smooth sequential engagement of the clutches and gradual full assumption of the load when clutch 79 finally is fully engaged. In the operation of the assembly shown in Fig. 5, the two clutches 115 and 116 engage simultaneously, but at a rate, controlled by the operator, sufficiently gradual that the constant normal governed operating speed of the prime mover will be maintained.

When the friction clutches have become completely engaged and the draw-works thereby has assumed the full load, the positive clutches 57 or 138 may be engaged to lock the drum against rotation on its shaft, if necessary. The provision of these positive clutches together with the friction clutches is a highly important feature in that the combination of clutches renders the unit controllable with respect to the rate at which the full load gradually is assumed, and yet enables the drum to be positively locked against rotation on its shaft when the full load has been taken, thus precluding the possibility of any difficulties being encountered by reason of slippage of the friction clutch under load.

When the load reaches the top of its travel, the friction and positive drum clutches are disengaged and the manually operated band brakes set. Then, after the elevator is detached from the drill pipe and is ready to descend, the brakes will be released and the blocks and hook will fall, the engine during the time running at its normal idling speed. As the elevator approaches its limit of descent, i. e. the proper location for attachment to a successive stand of drill pipe, the friction clutches may be engaged sufficiently to retard and arrest the elevator fall without having to use the friction brakes. Thereafter, the friction clutches will be engaged to hoist the load and the hoisting operations repeated, all as previously described.

In the operation of lowering the pipe string into the hole, the elevator first is hoisted in the derrick and attached to the pipe. Clutch 26 is then disengaged, permitting the motor to run freely. Under the pipe string load, the winding drum is rotated to drive the speed transmission shafts in a reverse direction and to operate the rotary braking pump P. The pump, together with its control valve V and the valve regulating mechanism, operate to brake the load in its downward travel and to maintain a predetermined rate of descent. As the elevator approaches its limit of descent, the manually operated drum brakes will be applied, the drum clutches released and the engine clutch 26 engaged. To move the blocks upward again, the friction brakes will be released and the drum clutches engaged. Thus, throughout the operations, no shocks are transmitted to the engine or applied to the other parts of the hoisting assembly.

I claim:

1. In an oil well hoist, a speed transmission, a prime mover and a drum shaft connected respectively to the high speed and low speed sides of said transmission, a cable winding drum rotatably mounted on said drum shaft; a positive clutch for holding said shaft and drum against relative rotation, and a pair of friction clutches at opposite ends of the drum for clutching said shaft to the drum.

2. In an oil well hoist, a speed transmission, a prime mover and a drum shaft connected respectively to the high speed and low speed sides of said transmission, a cable winding drum rotatably mounted on said drum shaft, a positive clutch for holding said shaft and drum against relative rotation, a pair of friction clutches at opposite ends of the drum for clutching said shaft to the drum, and means for sequentially actuating said friction clutches.

3. In an oil well hoist, a speed transmission, a prime mover and a drum shaft connected respectively to the high speed and low speed sides of said transmission, a cable winding drum rotatably mounted on said drum shaft, said drum having brake flanges at opposite ends, braking means applied to said flanges, a positive clutch for holding said shaft and drum against relative rotation, and independently operable means for frictionally clutching said shaft to the drum, the last mentioned means including annular clutch seats within the flanged ends of the drum, and a pair of clutch members splined to said shaft and movable longitudinally thereof into engagement with said seats.

4. In an oil well hoist, a speed transmission, a prime mover and a drum shaft connected respectively to the high speed and low speed sides of said transmission, a cable winding drum rotatably mounted on said drum shaft, said drum having brake flanges at opposite ends, braking means applied to said flanges, a positive clutch for holding said shaft and drum against relative rotation, and independently operable means for frictionally clutching said shaft to the drum, the last mentioned means including annular clutch seats within the flanged ends of the drum, each of said seats comprising annularly spaced conical friction surfaces, and a pair of clutch members splined to said shaft and movable longitudinally thereof into engagement with said seats, each of said clutch members being wedge-shaped in cross-section and having conical surfaces engageable with the drum conical friction surfaces.

5. In an oil well hoist, a speed transmission, a prime mover and a drum shaft connected respectively to the high speed and low speed sides of said transmission, a cable winding drum rotatably mounted on said drum shaft, said drum having brake flanges at opposite ends, braking means applied to said flanges, a positive clutch for holding said shaft and drum against relative rotation, independently operable means for frictionally clutching said shaft to the drum, the last mentioned means including annular clutch seats within the flanged ends of the drum, and a pair of clutch members splined to said shaft and movable longitudinally thereof into engagement with said seats, and fluid pressure actuated means for operating said friction clutches.

6. In an oil well hoist, a speed transmission, a prime mover and a drum shaft connected respectively to the high sped and low speed sides of said transmission, a cable winding drum rotatably mounted on said drum shaft, said drum having brake flanges at opposite ends, braking means applied to said flanges, a positive clutch splined to said shaft and engageable with one end of the drum within the brake flange to hold said shaft and drum against relative rotation, and independently operable means for frictionally clutching said shaft to the drum, the last mentioned means including annular clutch seats within the flanged ends of the drum, and a pair of clutch members splined to said shaft and movable longitudinally thereof into engagement with said seats.

7. In an oil well hoist, a speed transmission, a prime mover and a drum shaft connected respectively to the high speed and low speed sides of said transmission, a cable winding drum movable rotatably and longitudinally on said drum shaft, a positive clutch for holding said drum and shaft against relative rotation, a pair of friction clutch members splined to the shaft and positioned at opposite ends of the drum for clutching said shaft to the drum, and means for moving one of said clutch members against the drum and for causing said drum to be moved longitudinally of the shaft into engagement with the other clutch member.

8. In an oil well hoist, a speed transmission, a prime mover and a drum shaft connected respectively to the high speed and low speed sides of said transmission, a cable winding drum movable rotatably and longitudinally on said drum shaft, a positive clutch for holding said drum and shaft against relative rotation, a pair of friction clutch members splined to the shaft and positioned at opposite ends of the drum for clutching said shaft to the drum, means for moving one of said clutch members against the drum and for causing said drum to be moved longitudinally of the shaft into engagement with the other clutch member, and means resisting such movement of the drum.

9. In an oil well hoist, a speed transmisison, a prime mover and a drum shaft connected respectively to the high speed and low speed sides of said transmission, a cable winding drum movable rotatably and longitudinally on said drum shaft, a positive clutch for holding said drum and shaft against relative rotation, a pair of friction clutch members splined to the shaft and positioned at opposite ends of the drum for clutching said shaft to the drum, means for moving one of said clutch members against the drum and for causing said drum to be moved longitudinally of the shaft into engagement with the other clutch member, and a coil spring encircling said shaft and resisting longitudinal movement of the drum.

10. In an oil well hoist, a speed transmission, a prime mover and a drum shaft connected respectively to the high speed and low speed sides of said transmission, a cable winding drum rotatably mounted on said drum shaft, said drum having brake flanges at opopsite ends, braking means applied to said flanges, a positive clutch including a sleeve splined to said shaft and movable longitudinally thereon into engagement with one end of the drum, a friction clutch member splined to said sleeve and movable longitudinally thereon into engagement with said end of the drum, and fluid pressure actuated means for operating said friction clutch independently of said positive clutch.

11. In an oil well hoist, a speed transmission, a prime mover and a drum shaft connected respectively ot the high speed and low speed sides of said transmission, a cable winding drum movable rotatably and longitudinally on said drum shaft, a positive clutch including a sleeve splined to said shaft and movable longitudinally thereon into engagement with one end of the drum, a friction clutch member splined to said sleeve and movable longitudinally thereon into engagement with the drum, and a second friction clutch member mounted on the shaft at the opposite end of the drum, said drum being movable longitudinally of the shaft by said first mentioned clutch member, into engagement with the second mentioned clutch member.

12. In an oil well hoist, a speed tranmission, a prime mover and a drum shaft connected respectively to the high speed and low speed sides of said transmission, a cable winding drum movable rotatably and longitudinally on said drum shaft, a positive clutch including a sleeve splined to said shaft and movable longitudinally thereon into engagement with one end of the drum, a friction clutch member splined to said sleeve and movable longitudinally thereon into engagement with the drum, and a second friction clutch member mounted on the shaft at the opposite end of the drum, said drum being movable longitudinally of the shaft by said first mentioned clutch member, into engagement with the second mentioned clutch member, and yielding means resisting such longitudinal movement of the drum.

13. In an oil well hoist, a speed transmission, a prime mover and a drum shaft connected respectively to the high speed and low speed sides of said transmission, a cable winding drum rotatably mounted on said drum shaft, said drum having brake flanges at opopsite ends, braking means applied to said flanges, a positive clutch including a sleeve splined to said shaft and movable longitudinally thereon into engagement with one end of the drum, a friction clutch member splined to said sleeve and movable longitudinally thereon into engagement with said end of the drum, and a second friction clutch member splined to the shaft and movable into engagement with the opposite end of the drum.

14. In an oil well hoist, a speed transmission, a prime mover and a drum shaft connected respectively to the high speed and low speed sides of said transmission, a cable winding drum rotatably mounted on said drum shaft, said drum comprising a hub and an annular brake flange extending beyond the end of the drum and spaced about said shaft, a positive clutch for holding said shaft and drum against relative rotation, said clutch comprising a sleeve slidable longitudinally on said shaft, interengageable clutch elements on the sleeve and drum, and an independently operable friction clutch for clutching said shaft to the drum, said friction clutch comprising means carried by the drum inside said flange and forming annular spaced and convergent friction surfaces surrounding said positive clutch elements, and a clutch member movable longitudinally but nonrotatably relative to said shaft and engageable with said friction surfaces.

15. In an oil well hoist, a speed transmission, a prime mover and a drum shaft connected respectively to the high speed and low speed sides of said transmission, a cable winding drum rotatably mounted on said drum shaft, said drum comprising a hub and an annular brake flange extending beyond the end of the drum and spaced about said shaft, a positive clutch for holding said shaft and drum against relative rotation, said clutch comprising a sleeve slidable longitudinally on said shaft, interengageable clutch elements on the sleeve and drum, a spring between said elements and tending to disengage them, and an independently operable friction clutch for clutching said shaft to the drum, said friction clutch comprising means carried by the drum inside said flange and forming annular spaced and convergent friction surfaces surrounding said positive clutch elements, and a clutch member movable longitudinally but nonrotatably relative to said shaft and engageable with said friction surfaces.

16. In an oil well hoist, a speed transmission, a prime mover and a drum shaft connected respectively to the high speed and low speed sides of said transmission, a cable winding drum movable rotatably and longitudinally on said drum shaft, means forming an annular friction surface on said drum, a brake applied to said surface, a positive clutch for holding said drum and shaft against relative rotation, a pair of friction clutch members splined to the shaft and positioned at opposite ends of the drum for clutching said shaft to the drum, means for moving one of said clutch members against the drum and for causing said drum to be moved longitudinally of the shaft into engagement with the other clutch member, and a mounting for said brake whereby the brake is movable with the drum during the said movement of the drum longitudinally of the shaft.

17. In an oil well hoist, a speed transmission, a prime mover and a drum shaft connected respectively to the high speed and low speed sides of said transmission, a cable winding drum movable rotatably and longitudinally on said drum shaft, means forming an annular friction surface on said drum, a brake element of narrower width than said surface applied thereto, a positive clutch for holding said drum and shaft against relative rotation, a pair of friction clutch members splined to the shaft and positioned at opposite ends of the drum for clutching said shaft to the drum, means for moving one of said clutch members against the drum and for causing said drum to be moved longitudinally of the shaft into engagement with the other clutch member, and a mounting for said brake element whereby said element is held against movement with the drum during the said movement of the drum longitudinally of the shaft.

JOHN E. BRANTLY.